Feb. 24, 1953
R. C. GRAVES
2,629,311
APPARATUS FOR PRESERVING MEAT
Filed June 28, 1949
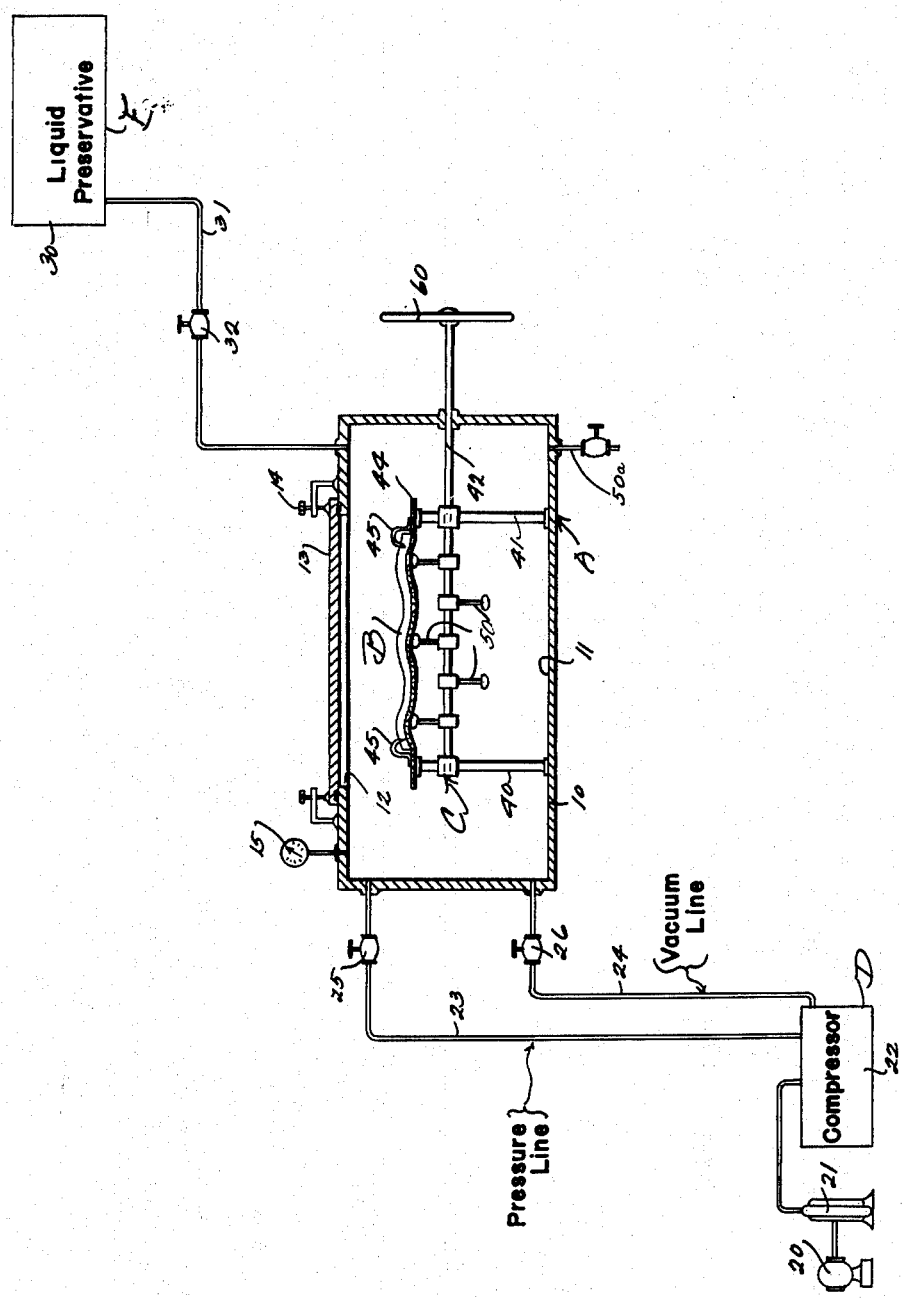
Robert C. Graves
INVENTOR.
BY *Lancaster Allwine and Rommel*
ATTORNEYS.

Patented Feb. 24, 1953

2,629,311

UNITED STATES PATENT OFFICE 2,629,311

APPARATUS FOR PRESERVING MEAT

Robert C. Graves, Washington, D. C.

Application June 28, 1949, Serial No. 101,736

1 Claim. (Cl. 99—255)

This invention relates to improvements in apparatus and processes for the curing of meat.

The primary object of this invention is the provision of an improved process for the curing of meat, such as bacon, thru subjection of the meat to treatment in a vacuum while the meat is being subjected to a mechanical contact operation for distending and distorting the cellular structure for the purpose of opening channels for the escape of air and gas from the meat; thereafter submerging the meat without breaking the vacuum in a liquid preservative and while so disposed further mechanically manipulating the meat under the application of normal or superatmospheric pressure for the purpose of enabling better entry of the liquid preservative into the air voids of the meat.

Other objects and advantages of the invention will be apparent from the following detailed description.

In the accompanying drawing, wherein for the purpose of illustration is diagrammatically shown apparatus for the processing of meat, the letter A may generally designate apparatus wherein meat B, such as a belly of bacon, may be supported upon means C for the purpose of mechanically agitating, massaging and kneading the same during the vacuum and pressure treatment to which it is subjected. Means D is provided for selectively creating a vacuum or normal or superatmospheric pressure in the compartment of the apparatus A, and means E is provided for supplying a liquid preservative to the compartment.

The apparatus A may consist of a tank or receptacle 10 having a compartment 11 therein and provided with an opening 12 over which a cover 13 is provided, clamping means 14 may be provided to seal the compartment 11 from loss of pressure or vacuum. A gauge 15 may be provided for reading the pressures in the compartment.

The means D may consist of a motor 20, pump 21 and control compressor 22. It also includes a pressure line 23 and a vacuum line 24 leading from the compressor control D and entering the compartment 11 of the tank 10; these lines 23 and 24 having control valves 25 and 26 therein. The liquid preservative means E may include a tank 30 having a gravity feed line 31 entering the tank 11 and having a control valve 32 therein.

The meat supporting and mechanical working means C may consist of standards or supports 40 and 41 rotatably supporting a shaft 42. The standards 40 and 41 carry a flexible meat supporting screen or table 44 upon which the bacon belly or meat B is disposed and maintained in proper position by releasable clamps 45, of any nature desired.

The shaft 42 is provided with agitating members 50 in the form of rollers, cams or arms having portions which are adapted to alternately contact the screen 44 and flex the same for the purpose of mechanically operating, moving, agitating and if desired, kneading the meat B.

The shaft 42 may extend externally of the tank 10 and there it is provided with a hand operating wheel 60 or a pulley to which power mechanism may be applied for the speed controlled operation of the shaft.

The process of treating the bacon, carcass or meat, is as follows:

The meat B is placed, as described, in the tank chamber 11 and the latter is then sealed. Thru the means D of a vacuum of 20 in. or more is applied to the chamber 11. The means to mechanically agitate the meat or bacon is set into operation and the cams or arms alternately flex and operate upon different portions of the meat in such manner that the meat is distended and distorted. This will open the cellular structure and channels in the meat for the escape of air and gas therefrom. After this has been going on for a predetermined time the liquid supply means E releases liquid to the compartment 11, without breaking the vacuum. The bacon belly, or meat B is entirely submerged in the liquid preservative and during its submergence the agitating means C continues to flex and operate upon it for the purpose of flexing the cellular structure and permit the forceful entry of the liquid preservative into the voids and cells from which the air and gas has been expelled. Of course after the bacon or meat has been submerged in the liquid preservative the means D is set into operation to break the vacuum and supply normal or superatmospheric pressure to the compartment 11 and the mechanical action continues while the meat or bacon is subjected to normal or superatmospheric pressure. Normally the meat is subjected to manipulation within compartment 11 in the successive steps described for periods ranging from a few minutes up, depending upon the cellular and structural characteristics of the particular type of meat being treated and the size of the individual piece. The liquid may be drained from the tank thru a valve 50a. Further treatment of the meat consists of soaking in the liquid preservative, either in compartment 11 before removal of the liquid or in alternate containers provided for the purpose, for periods determined again by the type and size of the meat being treated. A two hour soaking period is found to suffice in the case of small size bacon bellies but the period may be somewhat shorter or longer depending on convenience and choice of the operator.

It is within contemplation of this invention to provide means for automatically handling a production flow of meat carcasses or bacon bellies. Under such circumstances, separate vacuum and pressure chambers will be maintained with suitable air locks therebetween and suitable conveyors for transferring the meat from one chamber to another; it of course being understood that in the vacuum and pressure chambers the meat while being treated with the preservative would be mechanically agitated, etc.

Various changes in the shape, size and arrangement of parts and to the various steps of the process herein described may be made to the form of the invention without departing from the spirit thereof or the scope of the claim.

I claim:

Apparatus for the treatment of meat comprising a container having a compartment therein, a flexible screenlike table in the compartment for supporting a body of flexible meat, such as a belly of bacon, means to clamp the belly of bacon in position upon the table against movement from the table, mechanical means carried by the container for variably flexing the table and the body of meat therewith, means to subject the compartment of the tank to vacuum or superatmospheric pressure, means to supply a liquid preservative to the tank, and means to drain the liquid preservative from the tank.

ROBERT C. GRAVES.

REFERENCES CITED

The following references are of record in the file of this patent:

UNITED STATES PATENTS

| Number | Name | Date |
|---|---|---|
| 4,035 | Scherpf | May 7, 1845 |
| 7,766 | Starkweather | Nov. 5, 1850 |
| 1,016,656 | Trescott | Feb. 6, 1912 |
| 2,013,156 | Jones et al. | Sept. 3, 1935 |
| 2,344,151 | Kasser | Mar. 14, 1944 |
| 2,471,282 | Paddock | May 24, 1949 |

FOREIGN PATENTS

| Number | Country | Date |
|---|---|---|
| 335,586 | Great Britain | Sept. 29, 1930 |
| 494,388 | Great Britain | Oct. 25, 1938 |
| 303,023 | Germany | Aug. 4, 1914 |